(12) United States Patent
Minamiura

(10) Patent No.: US 9,286,178 B2
(45) Date of Patent: Mar. 15, 2016

(54) CONTROLLER, STORAGE APPARATUS, METHOD OF TESTING STORAGE APPARATUS, AND COMPUTER-READABLE STORAGE MEDIUM

(71) Applicant: FUJITSU LIMITED, Kawasaki-shi (JP)

(72) Inventor: Kiyoto Minamiura, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 385 days.

(21) Appl. No.: 13/766,029

(22) Filed: Feb. 13, 2013

(65) Prior Publication Data

US 2013/0246857 A1  Sep. 19, 2013

(30) Foreign Application Priority Data

Mar. 19, 2012 (JP) .................. 2012-062376

(51) Int. Cl.
  *G06F 11/00* (2006.01)
  *G06F 11/26* (2006.01)
  *G06F 11/267* (2006.01)
(52) U.S. Cl.
  CPC .............. *G06F 11/26* (2013.01); *G06F 11/267* (2013.01)
(58) Field of Classification Search
  CPC .... G06F 11/221; G06F 11/2221; G06F 11/26
  See application file for complete search history.

(56) References Cited

U.S. PATENT DOCUMENTS

| 5,611,069 A | 3/1997 | Matoba |
| 6,754,853 B1* | 6/2004 | DeKoning et al. ............... 714/42 |
| 6,950,967 B1* | 9/2005 | Brunnett et al. ................ 714/42 |
| 7,765,433 B1* | 7/2010 | Krishnamurthy ............... 714/42 |
| 2003/0195738 A1 | 10/2003 | Shoyama |

FOREIGN PATENT DOCUMENTS

| JP | 07-129331 | 5/1995 |
| JP | 2000-47972 | 2/2000 |

* cited by examiner

*Primary Examiner* — Michael Maskulinski
(74) *Attorney, Agent, or Firm* — Fujitsu Patent Center

(57) ABSTRACT

A controller includes an address generator that sets a plurality of different paths, each connecting an information processing apparatus connected to a storage apparatus via a network, first and second storage mediums, and the controller, and generates a second address that is different from a first address used for a communication with the information processing apparatus via the network; an access monitor that determines that no access has been issued for a certain time duration from the information processing apparatus to the first or second storage medium; an access issuing unit that issues a test access to the first and second storage mediums on one of the paths, using the second address; and an access decoder that converts the test access to an access including the first address, receives a result of the access including the first address from the first or second storage mediums, and checks for an error.

17 Claims, 16 Drawing Sheets

FIG. 7

| ITEM# | PATH | NOTES |
|---|---|---|
| p1 | (1)→(2)→(6)→(12) (Disk #2) | Identical to normal host access path |
| p2 | (1)→(2)→(8)→(7)→(4)→(11) (Disk #2) | Path accessed only during maintenance of NAS #2 |
| p3 | (1)→(2)→(5)→(10) (Disk #1) | Path accessed only during maintenance of NAS #1 |
| p4 | (1)→(2)→(8)→(7)→(3)→(9) (Disk #1) | Path accessed only during maintenance of NAS #1 |

FIG. 8

| ITEM# | PATH | NOTES |
|---|---|---|
| p5 | (2)→(1)→(3)→(9) (Disk #1) | Identical to normal host access path |
| p6 | (2)→(1)→(7)→(8)→(5)→(10) (Disk #1) | Path accessed only during maintenance of NAS #1 |
| p7 | (2)→(1)→(4)→(11) (Disk #2) | Path accessed only during maintenance of NAS #2 |
| p8 | (2)→(1)→(7)→(8)→(6)→(12) (Disk #2) | Path accessed only during maintenance of NAS #2 |

| PATTERN NO. | TEST IO ORIGINATOR | ACCESS PATH | DESTINATION |
|---|---|---|---|
| 1 | NAS#1 | p1 | RAID521 |
| ∫ | ∫ | ∫ | ∫ |
| 5 | NAS#1 | p1 | RAID525 |
| 6 | NAS#1 | p2 | RAID521 |
| ∫ | ∫ | ∫ | ∫ |
| 10 | NAS#1 | p2 | RAID525 |
| 11 | NAS#1 | p3 | RAID511 |
| ∫ | ∫ | ∫ | ∫ |
| 15 | NAS#1 | p3 | RAID515 |
| 16 | NAS#1 | p4 | RAID511 |
| ∫ | ∫ | ∫ | ∫ |
| 20 | NAS#1 | p4 | RAID515 |
| 21 | NAS#2 | p5 | RAID511 |
| ∫ | ∫ | ∫ | ∫ |
| 25 | NAS#2 | p5 | RAID515 |
| 26 | NAS#2 | p6 | RAID511 |
| ∫ | ∫ | ∫ | ∫ |
| 30 | NAS#2 | p6 | RAID515 |
| 31 | NAS#2 | p7 | RAID521 |
| ∫ | ∫ | ∫ | ∫ |
| 35 | NAS#2 | p7 | RAID525 |
| 36 | NAS#2 | p8 | RAID521 |
| ∫ | ∫ | ∫ | ∫ |
| 40 | NAS#2 | p8 | RAID525 |

FIG. 12

| | 0x0 | 0x4 | 0x8 | 0xc | 0xf |
|---|---|---|---|---|---|
| 75 | Path index 72 | Path connection target 1 73 | reserved (0x0000, 0xffff for last path) 77 | Path connection target 2 74 | |
| | Path connection target 2 | reserved (0x00) 76 | | | |
| | (Repeat the above block for each path) 79 | | | | |
| 78 | Disk index | Path index | RAID number 80 | Allocation status 81 | |
| | (Repeat the above block for each disk) | | | | |
| 82 | 0xffff | reserved (0x0000) 83 | | | |

| | 0x0 | 0x4 | 0x8 | 0xc | 0xf |
|---|---|---|---|---|---|
| | Pattern index | Config path 1 index | Config path 2 index | Config path 3 index | |
| | (Repeat the above block for each access pattern index) | | | | |
| | 0xffff | 0x0000 | Access path index | Access destination | |
| | Pattern index | Test IO originator | | | |
| | test content | | | | |
| | test content (cont.) | | | | |
| | test content (cont.) | | | | |
| | 0xffff | | 0xff00 | | |
| | (Repeat the above block for each pattern table) | | | | |
| | 0xffff | | | | |

CONTROLLER, STORAGE APPARATUS, METHOD OF TESTING STORAGE APPARATUS, AND COMPUTER-READABLE STORAGE MEDIUM

CROSS-REFERENCE TO RELATED APPLICATION

This application is based upon and claims the benefit of priority of the prior Japanese Patent Application No. 2012-062376, filed on Mar. 19, 2012, the entire contents of which are incorporated herein by reference.

FIELD

The present embodiment relates to a controller, a storage apparatus, a method of testing a storage apparatus, and a tangible computer-readable storage medium.

BACKGROUND

Network attached storage (NAS) systems have been widely used, which are connected to hosts through a local area network (LAN), and have cluster configurations having multiple storage devices.

An example of such a storage system 200 is depicted in FIGS. 14 to 16.

FIG. 14 is a schematic diagram illustrating an example of the storage system 200. FIG. 15 is a schematic diagram illustrating paths used during normal operations in a NAS in FIG. 14, and FIG. 16 is a schematic diagram illustrating paths which cannot be tested in the NAS in FIG. 14.

The storage system 200 includes a host 201, a network storage system (NAS) 203-1 (also referred to as NAS #1 in the figure), a NAS 203-2 (NAS #2), a disk 205-1 (disk #1), and a disk 205-2 (disk #2).

The NASs 203-1 and 203-2 are information processing apparatuses that control the disks 205-1 and 205-2. The NAS 203-1 and the NAS 203-2 have similar hardware and software configurations.

The disks 205-1 and 205-2 include a redundant array of independent disks (RAID) configurations, and the disks 205-1 and 205-2 have similar hardware configurations. The disk 205-1 includes five RAID disk drives (not illustrated), and the disk 205-2 includes five RAID disk drives (not illustrated).

The NAS 203-1 and the NAS 203-2 are connected to each other through a local area network (LAN) 211, using the Ethernet®, for example.

The NAS 203-1 and the NAS 203-2 are also connected to each other through an interconnect 215, such as a Fiber Channel (FC), for example.

The NAS 203-1 and the disk 205-1 are connected to each other through a disk interface channel (I/F CH) 213-1, and the NAS 203-1 and the disk 205-2 are connected to each other through a disk interface channel 213-2, for example. The NAS 203-2 and the disk 205-1 are connected to each other through a disk interface channel 213-3, and the NAS 3-2 and the disk 205-2 are connected to each other through a disk interface channel 213-4, for example.

The disk interface channels 213-1 to 213-4 are disk interconnects, such as FCs and Serial Attached SCSIs (small computer systems interfaces) (SASs), for example.

Note that the reference symbol 203-1 or 203-2 is used hereinafter for referring to a specific NAS while reference symbol 203 is used when reference is made to any of the multiple NASs.

Note that the reference symbol 205-1 or 205-2 is used hereinafter for referring to a specific disk while reference symbol 205 is used when reference is made to any of the multiple disks.

Note that one of the reference symbols 213-1 to 213-4 is used hereinafter for referring to a specific disk interface channel while reference symbol 213 is used when reference is made to any of the multiple disk interface channels.

Here, the NAS 203-1 and the NAS 203-2 form a cluster. As used herein, the term "cluster" or "cluster configuration" refers to the configuration where the NAS 203-1, the NAS 203-2, and the disks 205-1 and 205-2 function as if they are a single device. More specifically, although the NAS 203-1 controls the disk 205-1 and the NAS 203-2 controls the disk 205-2 during normal operations, the NAS 203-1 and the NAS 203-2 can also control both of the disks 205-1 and 205-2.

Hereinafter, a set of one NAS 203 and one disk 205 may also be referred to as a cluster.

During normal operations, the NAS 203-1 and the NAS 203-2 respectively controls their own disks 205. In the case of a failure of one of the NASs 203, the other NAS 203 controls the disks 205-1 and 205-2, undertaking the function of the failed NAS 203. At that time, the redundant paths, i.e., the interface channel 213-2 or 213-3, depicted in FIG. 15 is used.

In the storage system 200, the host 201 is connected to the storage system 200 through the LAN 211. Specifically, the host 201 is connected to the NAS 203-1 and the NAS 203-2 through the LAN 211, and accesses the disks 205-1 and 205-2 controlled by the NASs 203 via the LAN 211.

In such a storage system 200, if an input/output (IO, access) from the host 201 to the disks 205 are absent, i.e., host IOs are idle, for a certain time duration, a continuity checks test is executed on each path.

For example, a continuity check on the path between the host 201 and the NASs 203 via the LAN 211 is executed by means of message communications.

A continuity check on the path between the NAS 203-1 and the NAS 203-2 via the LAN 211 is executed using the Gratuitous Address Resolution Protocol (gARP), for example.

Continuity checks on the paths between the NASs 203 and the disks 205 are executed by means of a patrol (continuity check test).

Some of the paths, however, cannot be checked in such continuity checks as described above. Such paths are indicated in FIG. 16.

For example, the logical operations of hardware or firmware upon an access of the disks 205 from the host 201 cannot be checked. For example, a test cannot be executed wherein data is written to a disk 205 from the host 201 and then the data is read to check whether the read value matches the expected value.

Further, as depicted on the right side of FIG. 16, the internal bus 207 in the NAS 203 under actual operating conditions cannot be checked in the continuity checks as described above.

Additionally, the operations of the interfaces 225, 227, 229-1, and 229-2 in the NAS 203 under actual operating conditions cannot be checked in the continuity checks.

In FIG. 16, the interface 225 is a host interface, the interface 227 is the FC interface, and interfaces 229-1 and 229-2 are disk interfaces.

Generally, for example, simple continuity checks of the internal bus 207 in the NAS 203 can be checked by accessing from the interface 225, to the interface 227 or the interface 229-1 or 229-2. However, such simple continuity checks may be insufficient, since the operation of and transfers in the internal bus 207 when the interface 225 uses the LAN may be different from those in the internal bus 207 within the NAS 203.

Further, although continuity checks under actual operating conditions are possible by accessing disks in the storage system 200 from the host 201, the resources of the host 201 are used and hence the performance of the host 201 deteriorates.

In tests that actually access to disks in the storage system 200 from the host 201, only paths that are used in normal operations are used. Hence, the redundant paths (see FIG. 15), which is one advantage of the cluster configuration, cannot be checked in continuity checks initiated by the host 201.

SUMMARY

In one aspect, a controller includes: an address generator that sets a plurality of different paths, each connecting an information processing apparatus connected to a storage apparatus via a network, first and second storage mediums, and the controller, and generates a second address that is different from a first address used for a communication with the information processing apparatus via the network; an access monitor that determines that no access has been issued for a certain time duration from the information processing apparatus to the first or second storage medium; an access issuing unit that issues, in response to the access monitor determining that no access has been issued for the certain time duration from the information processing apparatus, a test access to the first and second storage mediums on one of the plurality of paths, using the second address; and an access decoder that converts the test access to an access including the first address, receives a result of the access including the first address from the one of the first and second storage mediums, and checks for an error.

In another aspect, a storage apparatus, includes: a first storage medium; a second storage medium; and a controller including: an address generator that sets a plurality of different paths, each connecting an information processing apparatus connected to a storage apparatus via a network, the first and second storage mediums, and the controller, and generates a second address that is different from a first address used for a communication with the information processing apparatus via the network; an access monitor that determines that no access has been issued for a certain time duration from the information processing apparatus to the first or second storage medium; an access issuing unit that issues, in response to the access monitor determining that no access has been issued for the certain time duration from the information processing apparatus, a test access to the first and second storage mediums on one of the plurality of paths, using the second address; and an access decoder that converts the test access to an access including the first address, receives a result of the access including the first address from the one of the first and second storage mediums, and checks for an error, wherein the first controller controls the first storage medium, and controls the second controller upon a failure of the second controller, the second controller controls the second storage medium, and controls the first controller upon a failure of the first controller.

In a further aspect, a method of testing a storage apparatus, includes: setting a plurality of different paths, each connecting an information processing apparatus connected to a storage apparatus via a network, first and second storage mediums, and a controller, and generating a second address that is different from a first address used for a communication with the information processing apparatus via the network; determining that no access has been issued for a certain time duration from the information processing apparatus to the first or second storage medium; issuing, in response to determining that no access has been issued for the certain time duration from the information processing apparatus, a test access to the first and second storage mediums on one of the plurality of paths, using the second address; and converting the test access to an access including the first address, receiving a result of the access including the first address from the one of the first and second storage mediums, and checking for an error.

In a further aspect, a tangible computer-readable storage medium, stores a test program for a storage apparatus, when executed by the computer, the test program making the computer to: set a plurality of different paths, each connecting an information processing apparatus connected to a storage apparatus via a network, first and second storage mediums, and a controller, and generate a second address that is different from a first address used for a communication with the information processing apparatus via the network; determine that no access has been issued for a certain time duration from the information processing apparatus to the first or second storage medium; issue, in response to determining that no access has been issued for the certain time duration from the information processing apparatus, a test access to the first and second storage mediums on one of the plurality of paths, using the second address; and convert the test access to an access including the first address, receive a result of the access including the first address from the one of the first and second storage mediums, and check for an error.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 7 illustrates a table indicating an example of the test paths (access patterns) in FIG. 4 in accordance with an example of an embodiment;

FIG. 8 illustrates a table indicating an example of the test paths (access patterns) in FIG. 5 in accordance with an example of an embodiment;

FIG. 9 illustrates a table indicating an example of a pattern table generated by an address generator in a test unit in accordance with an example of an embodiment;

FIG. 12 is a diagram illustrating an example of the data format used for exchanging configuration information between clusters in the storage system in accordance with an example of an embodiment;

FIG. 13 is a diagram illustrating an example of the data format used for transmitting test table information in the storage system in accordance with an example of an embodiment;

DESCRIPTION OF EMBODIMENT(S)

Hereunder is a description of an embodiment in accordance with the disclosed technique with reference to the drawings.

(A) System Configuration

The configuration of a storage system (storage apparatus) 1 in accordance with an example of an embodiment will be described.

Figure 1:
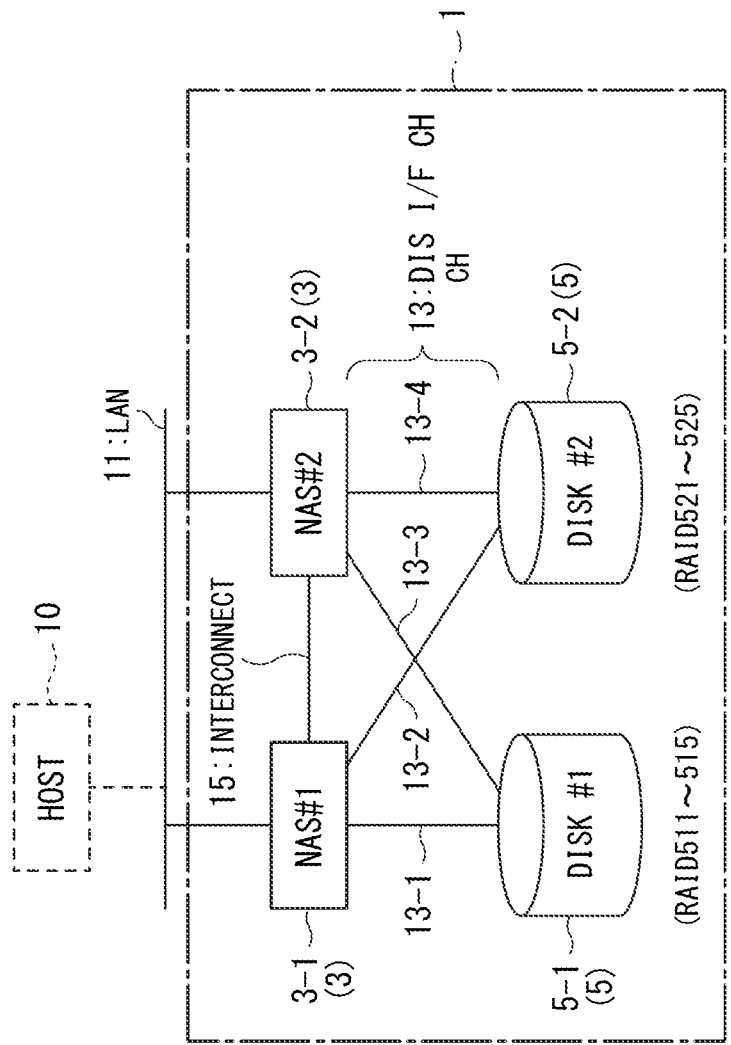
FIG. 1 is a schematic diagram illustrating the configuration of a storage system in accordance with an example of an embodiment.

FIG. 1 is a schematic diagram illustrating a configuration of the storage system 1 in accordance with an example of an embodiment.

The storage system 1 includes a NAS 3-1 (controller; denoted by NAS #1 in the figure), a NAS 3-2 (controller; NAS #2), a disk 5-1 (first storage medium; disk #1), and a disk 5-2 (second storage medium; disk #2), for example.

The NASs 3-1 and 3-2 are information processing apparatuses that control the disks 5-1 and 5-2. The NAS 3-1 and the NAS 3-2 have similar hardware and software configurations.

The disks 5-1 and 5-2 include RAID configurations, and the disks 5-1 and 5-2 have similar hardware configurations. The disk 5-1 includes five RAID disk drives (a plurality of drives; hereinafter, simply referred to as RAIDs) 511-515 (not illustrated), and the disk 5-2 includes five RAID disk drives (a plurality of drives) 521-525 (not illustrated) (see FIG. 9).

The NAS 3-1 and the NAS 3-2 are connected to each other through a LAN 11, using the Ethernet, for example.

The NAS 3-1 and the NAS 3-2 are also connected to each other through an interconnect 15, such as a Fiber Channel, for example.

The NAS 3-1 and the disk 5-1 are connected to each other through a disk interface channel 13-1, and the NAS 3-1 and the disk 5-2 are connected to each other through a disk interface channel 13-2, for example. The NAS 3-2 and the disk 5-1 are connected to each other through a disk interface channel 13-3, and the NAS 3-2 and the disk 5-2 are connected to each other through a disk interface channel 13-4, for example.

The disk interface channels 13-1 to 13-4 are disk interconnects, such as FCs and SASs, for example.

Note that the reference symbol 3-1 or 3-2 is used hereinafter for referring to a specific NAS while reference symbol 3 is used when reference is made to any of the multiple NASs.

Note that the reference symbol 5-1 or 5-2 is used hereinafter for referring to a specific disk while reference symbol 5 is used when reference is made to any of the multiple disks.

Note that one of the reference symbols 13-1 to 13-4 is used hereinafter for referring to a specific disk interface channel while reference symbol 13 is used when reference is made to any of the multiple disk interface channels.

Here, the NAS 3-1 and the NAS 3-2 form a cluster. As used herein, the term "cluster" or "cluster configuration" refers to the configuration where the NAS 3-1, the NAS 3-2, and the disks 5-1 and 5-2 function as if they are a single device. More specifically, although the NAS 3-1 controls the disk 5-1 and the NAS 3-2 controls the disk 5-2 during normal operations, the NAS 3-1 and the NAS 3-2 can also control both of the disks 5-1 and 5-2.

Hereinafter, a set of one NAS 3 and one disk 5 may also be referred to as a cluster.

During normal operations, the NAS 3-1 and the NAS 3-2 respectively controls their own disks 5. In the case of a failure of one of the NASs 3, the other NAS 3 controls the disks 5-1 and 5-2, undertaking the function of the failed NAS 3. In that sense, the interface channels 13-2 and 13-3 are redundant paths.

In the storage system 1, a host 10 (information processing apparatus) external to the storage system 1 is connected to the storage system 1 through the LAN 11. Specifically, the host 10 is connected to the NAS 3-1 and the NAS 3-2 through the LAN 11, and accesses the disks 5-1 and 5-2 controlled by the NASs 3 via the LAN 11.

Figure 2:
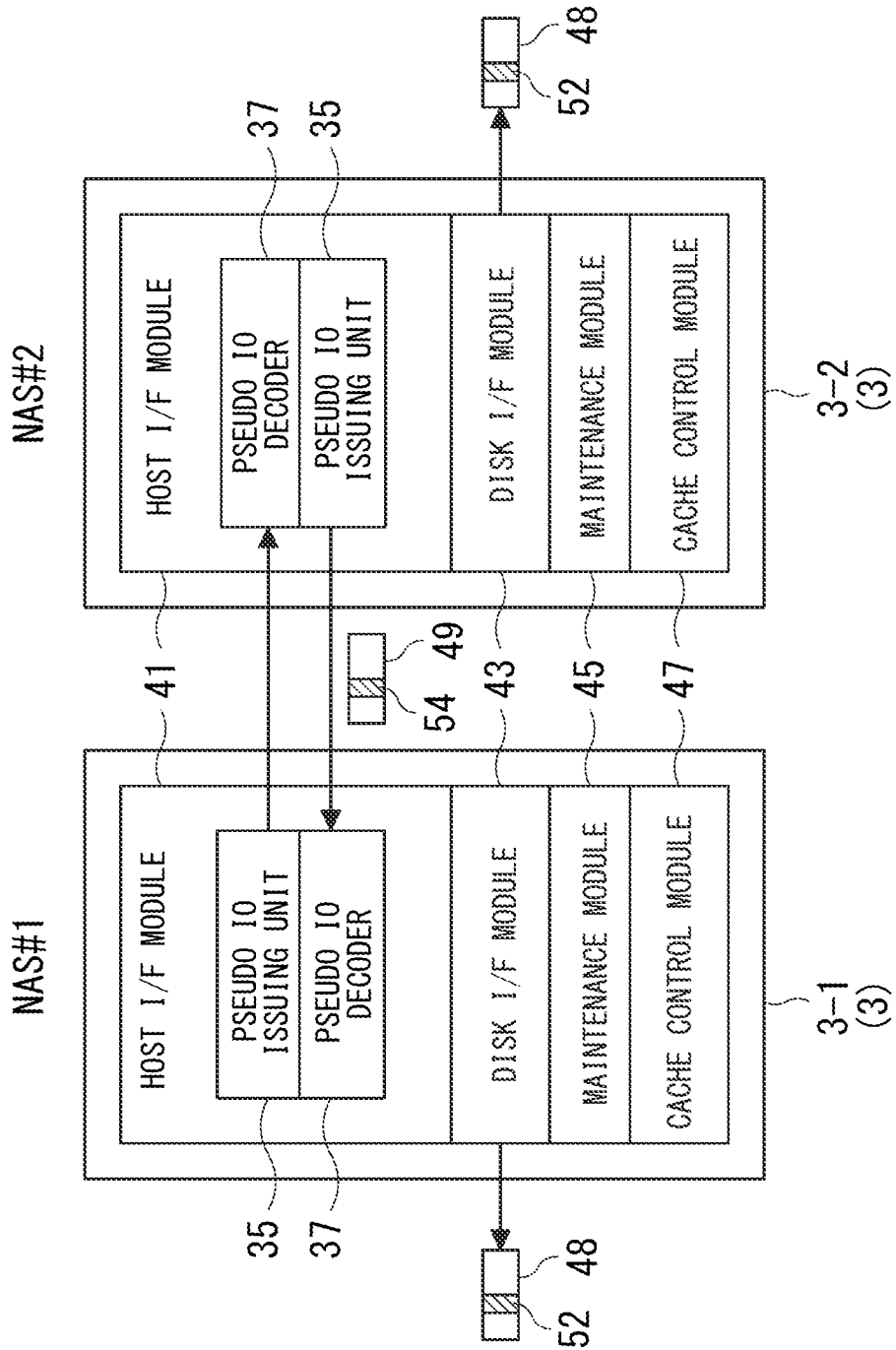
FIG. 2 is a schematic diagram illustrating the software configuration of NASs in the storage system in accordance with an example of an embodiment.

FIG. 2 is a schematic diagram illustrating the software configuration of the NASs 3 in the storage system 1 in accordance with an example of an embodiment.

Each NAS 3 includes software modules, namely, a host interface module 41, a disk interface module 41, a maintenance module 45, and a cache control module 47, for example.

The host interface module 41 is a module used for interfacing between the NASs 3 and the host 10, for example, and sends, receives, and diagnoses host IOs. The host interface module 41 includes a pseudo IO issuing unit 35 and a pseudo IO decoder 37, which will be described later.

The pseudo IO issuing unit 35 issues a test pseudo IO 49 based on a test IP address 54 (see FIG. 3) and a pattern table 62 (see FIG. 9), which will be described later, to initiate a continuity test.

The pseudo IO decoder 37 decodes the content in a pseudo IO 49 received from the local NAS 3 or the counterpart NAS 3. If the pseudo IO 49 instructs a disk access operation (e.g., a read, write, verify), the pseudo IO decoder 37 generates a normal IO 48 instructing that disk access operation, thereby inducing an actual access to a disk 5. Upon generating the normal IO 48, the pseudo IO decoder 37 replaces the host IP address 54 (described later) specified in that pseudo IO 49 with a host IP address 52. After a disk access, the pseudo IO decoder 37 checks for an error to verify the result of the disk access, and stores that result.

The disk interface module 43 is a module used for interfacing between the NASs 3 and the disk 5, for example, and sends and receives disk IOs.

The maintenance module 45 is a module for detecting errors in the NAS 3, for example.

The cache control module 47 executes controls on a nonvolatile random access memory (NVRAM, not illustrated), data controls, and the like.

Figure 3:
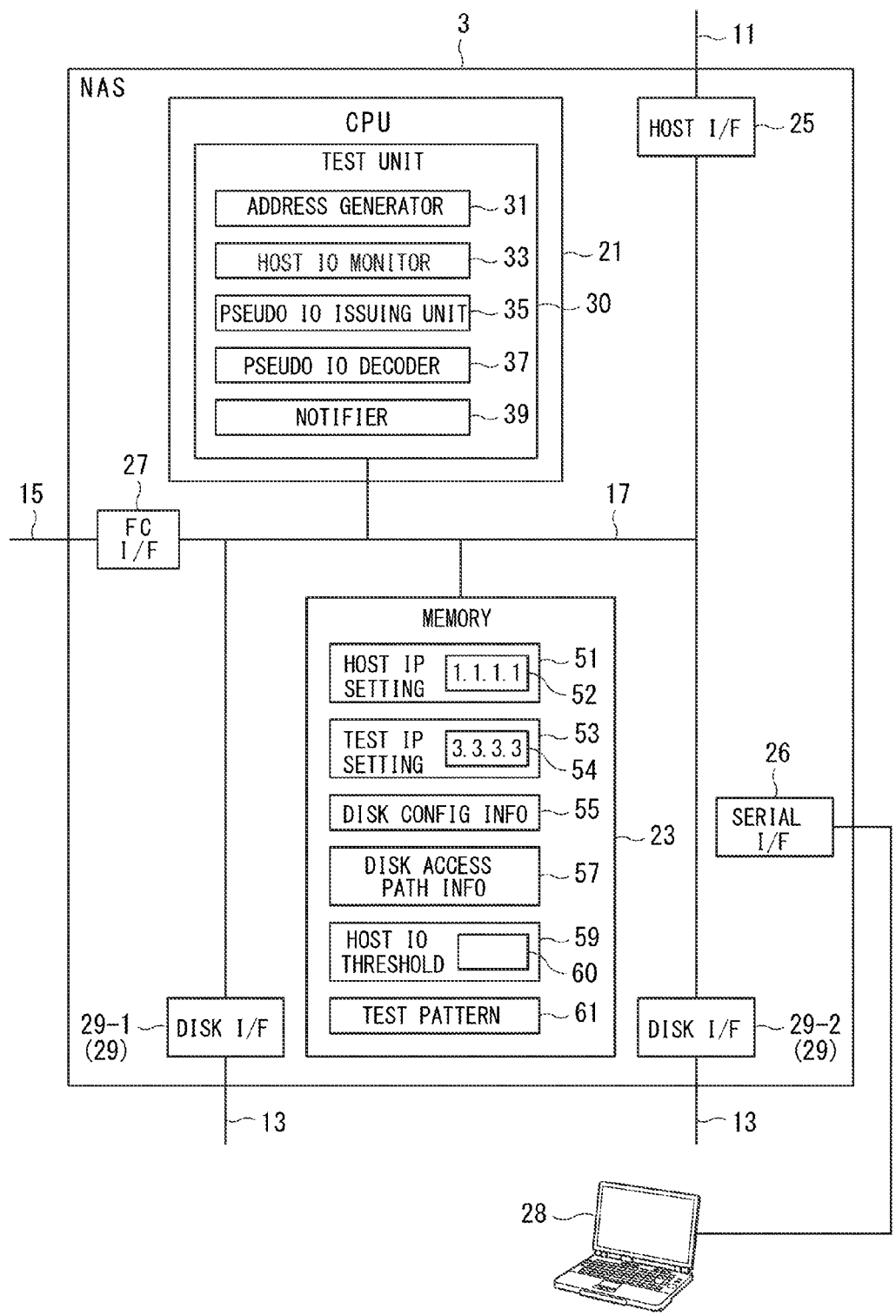
FIG. 3 is a schematic diagram illustrating the hardware and functional configurations of a NAS in the storage system in accordance with an example of an embodiment.

FIG. 3 is a schematic diagram illustrating the hardware and functional configurations of a NAS 3 in the storage system 1 in accordance with an example of an embodiment.

The NAS 3 includes an internal bus 17, a central processing unit (CPU) 21, a memory 23, a host interface 25, an FC interface 27, a serial interface 26, and disk interfaces 29-1 and 29-2.

The internal bus 17 is an interconnection bus internally connecting among the CPU 21, the memory 23, the host interface 25, the FC interface 27, the serial interface 26, and the disk interfaces 29-1 and 29-2 and other components in the NAS 3.

The CPU 21 is a processor that reads a test program from a storage, such as the memory 23, for example, and executes processing as a test unit 30 which will be described later.

The memory 23 is used to temporary store various kinds of programs and data when the CPU 21 executes computing and controls. The memory 23 also functions as a storage that stores various kinds of data used by the test unit 30. The memory 23 is a random access memory (RAM) or a read only memory (ROM), for example.

The host interface 25 is an interface used for connecting with the host 10, and is a LAN card, for example.

The serial interface 26 is a serial interface used for connecting with a personal computer (PC) 28 used by a customer engineer for maintenances, for example. The NAS 3 and the PC 26 are connected to each other by means of telnet, for example.

The FC interface 27 is an interface for connecting between the NASs 3, and is an FC interface card, for example.

The disk interface 29-1 is an interface used for connecting with the disk 5-1 (see FIG. 1), and is an FC card or a SAS card, for example.

The disk interface 29-2 is an interface used for connecting with the disk 5-2 (see FIG. 1), and is an FC card or a SAS card, for example.

The disk interface 29-1 and the disk interface 29-2 are similarly configured.

Note that the reference symbol 29-1 or 29-2 is used hereinafter for referring to a specific disk interface while reference symbol 29 is used when reference is made to any of the multiple disk interfaces.

The CPU 21 functions as the test unit 30 by executing a test program. The test unit 30 includes an address generator 31, a host IO monitor (address monitor) 33, a pseudo IO issuing unit (address issuing unit) 35, a pseudo IO decoder (access decoder) 37, and a notifier 39.

The test unit 30 issues pseudo IOs within the local NAS 3, or from the local NAS 3 to the counterpart NAS 3, to access the disk 5 from the local NAS 3 or via the counterpart NAS 3, thereby checking continuities under the condition mimicking actual operations of the storage system 1.

Specifically, the test unit 30 recognizes and analyses the configurations of the two clusters, and generates a pattern table 62 (described later) including backup paths (redundant paths).

The test unit 30 also analyzes IO (access) behaviors and histories, and determines an optimal test order in the pattern table 62 based on the access patterns.

When no IO has been issued from the host 10 for a certain time duration (i.e., when host IOs are idle), the test unit 30 issues pseudo IOs within the local cluster, or from the local cluster to the counterpart cluster. In this manner, the test unit 30 monitors host IOs from the host 10, and executes a continuity test without requiring intervention of the host 10, when no host IO has been detected for a certain time duration.

The address generator 31 initializes the test unit 30 when the NAS 3 is powered on. During the initialization, the address generator 31 sets a host IO waiting threshold that is a time duration waiting for host IOs, and stores it in a host IO threshold storage 59 as a host IO threshold 60 (described later). The address generator 31 also sets the test IP address 54 (described later) used to issue a pseudo IO, and stores it in a test IP address storage 53. When the local NAS 3 is the primary cluster (the cluster that starts up earlier after being powered on), the address generator 31 generates test patterns and stores them in a test pattern storage 61 as the pattern table 62 (see FIG. 9).

The address generator 31 shares a host IP address 52, a test IP address 54, disk configuration information 56, disk access path information 58, the host IO threshold 60, and the pattern table 62 with the counterpart NAS 3, by means of an inter-cluster communication.

As used herein, the inter-cluster communication refers to data exchange between the NASs 3 configuring a single cluster, via the interconnect 15.

The host IO monitor 33 monitors IOs (accesses) from the host 10, and determines whether the time duration set as the host IO threshold 60 (described later) elapses after the last host IO was detected.

The pseudo IO issuing unit 35 issues a test pseudo IO 49 based on a test IP address 54 and a pattern table 62, which will be described later, to initiate a continuity test, as described above.

The pseudo IO decoder 37 decodes the content in a pseudo IO received from the local NAS 3 or the counterpart NAS 3, as described above. If the pseudo IO instructs a disk access operation (e.g., a read, write, verify), the pseudo IO decoder 37 generates a normal IO instructing that disk access operation, thereby inducing an actual access to a disk 5. Upon generating the normal IO, the pseudo IO decoder 37 replaces the host IP address 54 (described later) specified in that pseudo IO with a host IP address 52. After a disk access, the pseudo IO decoder 37 checks for an error to verify the result of the disk access, and stores that result.

A pseudo IO is generated when a disk 5 is accessed from the local NAS 3, without going through the counterpart NAS 3. In such a case, the pseudo IO issuing unit 35 issues an pseudo IO and sends it to a pseudo IO analyzer 37 in the local NAS 3 (e.g., by means of an inter-process communication), and the pseudo IO analyzer 37 replaces the source address in a IP packet with the host IP address 52.

The notifier 39 sends notifications, such as test ready notifications and test suspend notifications, to the counterpart cluster, and reports an error to a system administrator or a customer engineer by sending an electric mail.

The memory 23 functions as a host IP address storage 51, a test IP address storage 53, a disk configuration information storage 55, a disk access path information storage 57, a host IO threshold storage 59, and a test pattern storage 61.

The host IP address storage 51 retains the host IP address 52 indicating an IP address allocated by the host 10 to the NAS 3. In FIG. 3, the address "1.1.1.1" is set in the host IP address storage 51 as the host IP address 52.

The host IP address 52 stored in the host IP address storage 51 is also used for normal operations, and is set in advance by the system administrator or the like. For example, when an access to the host IP address 52 is generated, the NAS 3 responds to and processes that access.

During a continuity test, the pseudo IO decoder 35 decodes a received pseudo IO for issuing an actual IO, and then replaces the test IP address 54 set as the source address with the host IP address 52 to generate an IP packet.

The test IP address storage 53 retains the test IP address 54 representing an IP address used by the NAS 3-1 or 3-2 as a source address, for generating a pseudo IO. In FIG. 3, the address "3.3.3.3" is set in the test IP address storage 53 as the test IP address 54.

Upon generating pseudo IO, the pseudo IO issuing unit 35 uses the test IP address 54 as a source address for generating an IP packet.

The test IP address 54 is selected by the address generator 31 from the address range that has not been allocated, so as not to overlap the addresses that have been allocated to the host 10, the NASs 3, and the like, upon a startup of the storage system 1. As will be described later with reference to FIG. 11, the test IP addresses 54 are shared between the clusters (the NASs 3) through an inter-cluster communication.

The test IP address 54 may be set manually by a user, or may be set by the address generator 31 from free IP addresses. In the latter case, if a system administrator sets reserved or allocated addresses in the LAN 11 to the NASs 3, any address collision can be prevented where an IP address that has been allocated or reserved is used as a test IP address. The test IP addresses 54 are shared between the clusters (the NASs 3) through an inter-cluster communication. When a cluster receives an access including the test IP address 54 as the source address from the counterpart cluster, that cluster can recognize that this access is a pseudo IO for a test.

The disk configuration information storage 55 stores disk configuration information (see FIG. 12) indicating which disk is connected to the NAS 3. The disk configuration information is used by the address generator 31 for generating the test patterns. Further, the disk configuration information is used when the pseudo IO issuing unit 35 generates IP packets for issuing pseudo IOs the as access target in the pseudo IOs. As will be described later with reference to FIG. 12, the disk configuration information is shared between the clusters (the NASs 3) through an inter-cluster communication upon a startup of the storage system 1.

The disk access path information storage 57 stores disk access path information 58 (see FIGS. 7 and 8) indicating disk access paths which are access paths from the NAS 3 to the disks 5. The disk access path information 58 is used when the address generator 31 generates the test pattern.

The details of the disk access path information 58 will be described later with reference to FIGS. 4 to 8. As will be described later with reference to FIG. 12, the disk access path information 58 is also shared between the clusters (the NASs 3) through an inter-cluster communication upon a startup of the storage system 1.

The host IO threshold storage 59 stores a host IO threshold 60 (not illustrated) that is the threshold for initiating issuance of pseudo IOs. The pseudo IO issuing unit 35 waits for any IO received from the host 10 for the time duration set in the host IO threshold 60 before issuing pseudo IOs. After the threshold time elapses without receiving any IOs from the host 10, the pseudo IO issuing unit 35 starts issuing pseudo IOs. That threshold is set to a certain value by the user when the storage system 1 is installed, and the user may change the value afterward. As will be described later with reference to FIG. 11, the host IO threshold 60 is shared between the clusters (the NASs 3) through an inter-cluster communication upon a startup of the storage system 1.

If the values of the host IO threshold 60 are different in the clusters (the NASs 3), the pseudo IO issuing unit 35 employs the higher value.

Generally, the host IO threshold 60 is set to a value in the range of several minutes to several hours, and any value outside this range may also be set depending on the configuration, the application, operations, and the like of the storage system 1.

Further, a separate threshold may also be stored in the host IO threshold storage 59, defining the time duration until the pseudo IO issuing unit 35 forcefully starts to issue pseudo IOs if no pseudo IO has been issued for that time duration.

The test pattern storage 61 stores a pattern table (test patterns) 62 depicted in FIG. 9. The pattern table 62 stores test patterns used by the test unit 30 in accordance with an example of the present embodiment for a continuity test, and will be described later with reference to FIG. 9. As will be described later with reference to FIG. 13, the pattern table 62 is also shared between the clusters (the NASs 3) through an inter-cluster communication upon a startup of the storage system 1.

Next, test paths (access patterns) used by the test unit 30 in accordance with an example of an embodiment for a test will be described with reference to FIGS. 4 to 8. These test paths (access patterns) are stored in the disk access path information storage 57, as the disk access path information 58 described above.

Figure 4:
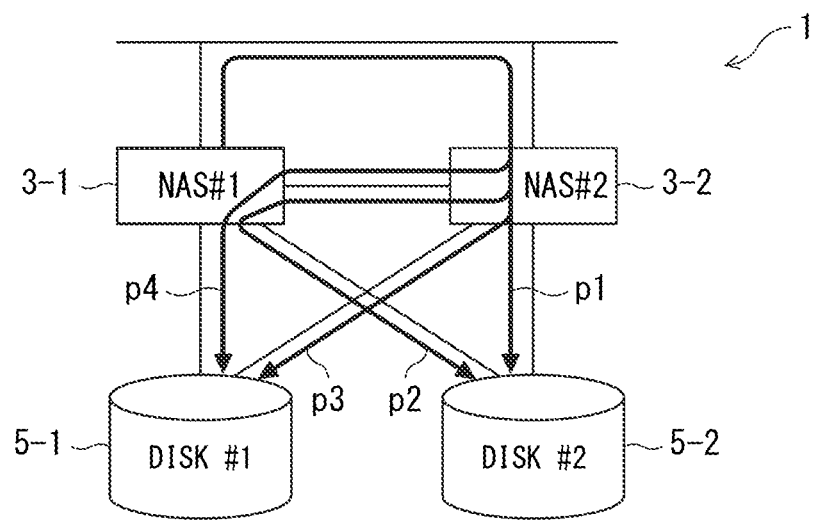
FIG. 4 is a schematic diagram illustrating test paths (access patterns) to be tested by a test unit in accordance with an example of an embodiment.
Figure 5:
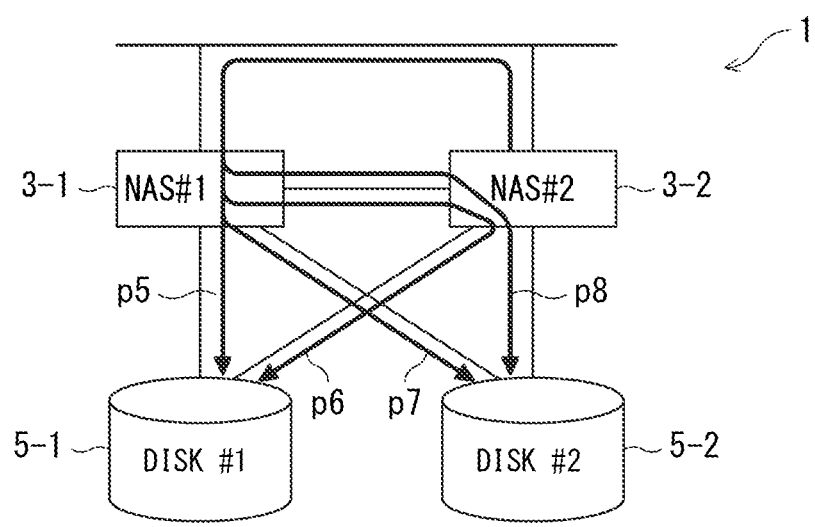
FIG. 5 is a schematic diagram illustrating test paths (access patterns) to be tested by a test unit in accordance with an example of an embodiment.

FIGS. 4 and 5 are schematic diagrams illustrating test paths (access patterns) to be tested by the test unit 30 in accordance with an example of an embodiment. FIG. 4 illustrates paths where the NAS 3-1 issues pseudo IOs to access the disks 5, while FIG. 5 illustrates paths where the NAS 3-2 issues pseudo IOs to access the disks 5.

Figure 6:
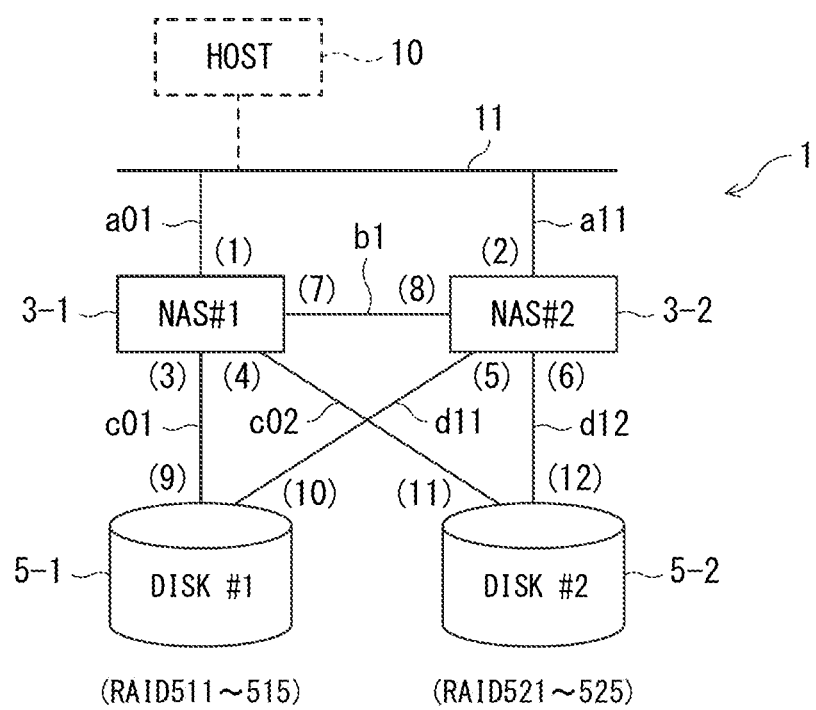
FIG. 6 is a diagram for illustrating FIGS. 4 and 5, in detail, in accordance with an example of an embodiment.

FIG. 6 is a diagram for illustrating FIGS. 4 and 5, in detail. FIG. 7 illustrates a table indicating an example of the test paths (access patterns) in FIG. 4, and the item numbers p1 to p4 in FIG. 7 correspond to paths p1 to p4 in FIG. 4. FIG. 8 illustrates a table indicating an example of the test paths (access patterns) in FIG. 5, and the item numbers p5 to p8 in FIG. 8 correspond to paths p5 to p8 in FIG. 5. The reference symbols (1) to (12) in the tables FIGS. 7 and 8 represent the interfaces (1) to (12) in FIG. 6.

The interfaces (1) and (2) in FIG. 6 represent the host interface 25 in the NAS 3-1 and the host interface 25 in the NAS 3-2, respectively. The interfaces (3), (4), (5), and (6) represents the disk interface 29-1 in the NAS 3-1, the disk interface 29-2 in the NAS 3-1, the disk interface 29-1 in the NAS 3-2, and the disk interface 29-2 in the NAS 3-2, respectively. The interfaces (7) and (8) in FIG. 6 represent the FC interface 27 in the NAS 3-1 and the FC interface 27 in the NAS 3-2, respectively. The interfaces (9) and (10) represent an interface (not illustrated) in the disk 5-1 connecting to the NAS 3-1 and an interface (not illustrated) in the disk 5-1 connecting to the NAS 3-2, respectively. The interfaces (11) and (12) represent an interface (not illustrated) in the disk 5-2 connecting to the NAS 3-1 and an interface (not illustrated) in the disk 5-2 connecting to the NAS 3-2, respectively.

For example, the path p1 in FIG. 4 starts at the NAS 3-1 and connects to the disk 5-2, via the interface (1), the interface (2), the interface (6), and the interface (12), as depicted in FIG. 7. The path p1 runs through the LAN 11, the internal bus 17 in the NAS 3-2, and the disk interface channel 13-4. The path p2 in FIG. 4 starts at the NAS 3-1 and connects to the disk 5-2, via the interface (1), the interface (2), the interface (8), the interface (7), the interface (4), and the interface (11), as depicted in FIG. 7, and is accessed only upon maintenance. The path p2 runs through the LAN 11, the internal bus 17 in the NAS 3-2, the interconnect 15, the internal bus 17 in the NAS 3-1, and the disk interface channel 13-4.

In this example, the disk access path information 58 includes eight test paths for continuity tests, as depicted in FIG. 7 and FIG. 8.

The disk access path information 58 is generated by a system administrator, and is stored in the disk access path information storage 57, in advance. Alternatively, the disk access path information 58 may be generated by the NAS 3 when the configuration of the storage system 1 is modified.

The disk access path information 58 may be generated in the following steps, for example.

Step (a): An index is provided to each of the paths.

For example, the indices a01 and a11 are provided to the access paths using the host interface, namely, the path between the host 10 and the interface (1) and the path between the host 10 and the interface (2) in FIG. 6.

The index b0 is provided to the FC interface 27 between the cluster when it is unused, and the index b1 is provided to the path between the interfaces (7) and (8) when it is used.

The indices c01 and c02, are provided to the disk access paths, namely, the path between the interfaces (3) and (9) and the path between the interfaces (4) and (11), respectively, and the indices d11 and d12 are provided to the disk access paths, namely, the path between the interfaces (5) and (10) and the path between the interfaces (6) and (12), respectively. Here, the indices cxx (xx represents integers) represent access paths from the NAS 3-1, while the indices dxx (xx represents integers) represent access paths from the NAS 3-2.

Step (b): Next, the NAS to be tested is selected. Firstly, the NAS 3-1 is selected for a test, then the NAS 3-2 is selected. When the NAS 3-1 is selected, the host interface of a01 is selected.

Step (c): Then, whether the FC interface 27 is used or not is selected. In other words, by using the FC interface 27, the disk access paths from the counterpart NAS 3 are used. When the FC interface 27 is not used, the disk access paths from the local NAS 3 are used.

Step (d): Finally, disk access paths are selected. Thereby all disk paths based on the above three conditions are generated.

The steps will be described using an example.

In Step (a), an index depicted in FIG. 6 is provided to each path.

Then proceeding to Step (b), the NAS 3-1 is selected and a01 is used.

Then proceeding to Step (c), the case where the FC interface 27 is used (b1) is selected.

Next proceeding to Step (d), all disk access paths connecting to the NAS 3-2 are selected. Thereby, two disk access paths a01-b1-d11 and a01-b1-d12 are generated.

Then returning to Step (c), the case where the FC interface 27 is not used (b01) is selected.

Next proceeding to Step (d), all disk access paths connecting to the NAS 3-1 are selected. Thereby, two disk access paths a01-b0-c01 and a01-b0-c02 are generated.

Then returning to Step (b), the NAS 3-2 is selected and a11 is used.

Then proceeding to Step (c), the case where the FC interface 27 is used (b1) is selected.

Next proceeding to Step (d), all disk access paths connecting to the NAS 3-1 are selected. Thereby, two disk access paths a01-b1-c01 and a01-b1-c02 are generated.

Then returning to Step (c), the case where the FC interface 27 is not used (b01) is selected.

Finally proceeding to Step (d), all disk access paths connecting to the NAS 3-2 are selected. Thereby, two disk access paths a11-b0-d11 and a11-b0-d12 are generated.

In the above steps eight disk access paths are generated.

Note that the paths p1 and p5 depicted in FIGS. 4 and 5 are paths used in normal accesses from the host 10 (referred to as "host accesses"). The other paths p2-p4 and p6-p8 are only used when one cluster fails and the paths are switched. Hence, the paths p2-p4 and p6-p8 are the paths wherein the continuity cannot be checked in normal host accesses.

The test unit 30 in accordance with an example of an embodiment can test the paths p2-p4 and p6-p8 which cannot be tested using the host 10, in addition to the paths p1 and path p5 used in host accesses, as depicted in FIGS. 4 and 5.

As described above, the disk access path information 58 is also shared between the NAS 3-1 and the NAS 3-2 through an inter-cluster communication upon a startup of the storage system 1.

FIG. 9 illustrates a table indicating an example of a pattern table 62 generated by the address generator 31 in the test unit 30 in accordance with an example of an embodiment.

After the NAS 3 is powered up, the address generator 31 generates, from the path information, a pattern table 62 which is a matrix of connection disk configuration information (see FIG. 12) and the disk access path information 58 depicted in FIGS. 7 and 8.

In the example depicted in FIG. 9, the pattern table 62 includes a pattern number field 63, a test IO originator field 65, a disk access path field 67, and an access destination field 69.

The pattern number field 63 indicates the number of a test pattern.

The test IO originator field 65 indicates the NAS 3 that issues a test pseudo IO.

The disk access path field 67 indicates a disk access path starting from the NAS 3 in the test IO originator field 65, and one of the paths p1-p8 in FIGS. 7 and 9 is selected, for example.

The access destination field 69 indicates a target RAID disk drive accessed in a disk 5 at the end of the access path in the disk access path field 67. For example, the disk access path 67 ends at the disk 5-1, one of the RAID disk drives 511-515 is selected and designated in the access destination field 69. The disk access path 67 ends at the disk 5-1, one of the RAID disk drives 521-525 is selected and written in the access destination field 69.

Since this example has eight test paths and five RAID disk drives, the pattern table field 62 has 8×5=40 patterns (in FIG. 9, some of these patterns are omitted). The number of patterns may be changed where necessary.

The pattern table 62 is generated by the address generator 31 immediately after the initial setting using an inter-cluster communication, upon a startup of the storage system 1.

The pattern table 62 generated by the address generator 31 and the pattern number of the pattern that is currently being tested by the pseudo IO decoder 37 is always shared between the between the clusters (the NASs 3) through the inter-cluster communication.

(B) System Operation

Next, the operation of the storage system 1 in accordance with an example of an embodiment will be described.

Figure 10:
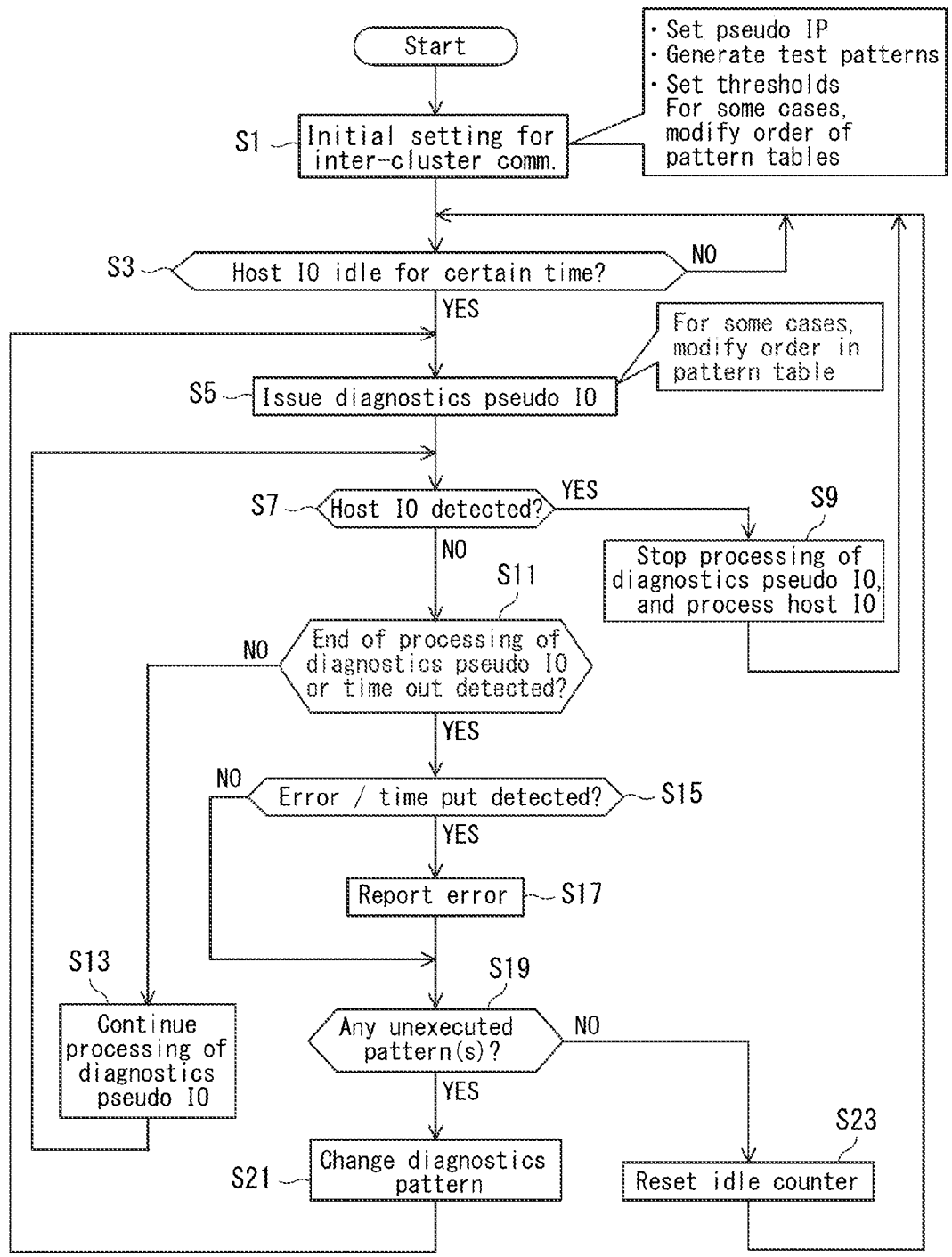
FIG. 10 is a flowchart illustrating processing by the test unit in accordance with an example of an embodiment.

FIG. 10 is a flowchart illustrating processing by the test unit 30 in accordance with an example of an embodiment;

Firstly, the NAS 3 is powered on. When the NAS 3 is powered on, in Step S 1, the address generator 31 in the test unit 30 sets initial settings for the NAS 3.

During the initialization, the address generator 31 sets a host IO waiting threshold that is a time duration waiting for host IOs, and stores it in a host IO threshold storage 59 as a host IO threshold 60, as described above. The address generator 31 also sets the test IP address 54 used to issue a pseudo IO, and stores it in a test IP address storage 53. When the local NAS 3 is a primary cluster (the cluster that starts earlier after being powered on), the address generator 31 generates test patterns and stores them in a test pattern storage 61 as the pattern table 62.

The address generator 31 shares a host IP address 52, a test IP address 54, the disk configuration information 56, disk access path information 58, the host IO threshold 60, and the pattern table 62 with the counterpart NAS 3, by means of an inter-cluster communication. The address generator 31 also receives the corresponding information from the other NAS 3 by means of the inter-cluster communication. Accordingly, the host IP address 52, the test IP addresses 54, the disk configuration information 56, the disk access path information 58, the host IO threshold 60, and the pattern table 62 are shared between the NAS 3-1 and the NAS 3-2 through the inter-cluster communication.

Alternatively, upon the initialization, the address generator 31 may modify the order of the test in the pattern table 62. The detail of modifying the order will be described later in Step S 5.

Once the address generator 31 completes the initialization, in Step S 3, the host IO monitor 33 determines whether the time duration set in the host IO threshold 60 elapses after the last host IO was detected. Note that the host IO threshold 60 is the host IO threshold set by the two clusters during the initial setting. If the values of the host IO threshold 60 are different in the two clusters, the address generator 31 employs the higher value.

If the time duration set as the host IO threshold 60 does not elapse after the last host IO was detected (refer to the NO route from Step S 3), the host IO monitor 33 returns to Step S 3 to continue to monitor for host IOs.

If the time duration set as the host IO threshold 60 elapses after the last host IO was detected (refer to the YES route from Step S 3), in Step S 5, the pseudo IO issuing unit 35 issues test pseudo IOs 49 based on the pattern table 62 to initiate a continuity test. Upon issuing pseudo IOs 4, the pseudo IO issuing unit 35 issues pseudo IOs, beginning from the first pattern (the pattern having the smallest pattern number) in the pattern table 62. The pseudo IO issuing unit 35 informs the counterpart cluster of the test pattern currently being executed.

Alternatively, the pseudo IO issuing unit 35 may modify the order of the patterns in the pattern table 62.

For example, the weights are given according to the importance of the data stored in the disks 5, and the order of the patterns is modifies so that disks 5 storing important data are tested preferentially.

Alternatively, the pseudo IO issuing unit 35 sorts the disk access paths (the paths p1 and p5) or the access destinations (RAIDs 511-515 and 521-525) based on their histories (the usage), and the pattern number including the least-used disk access path or access destination may be moved to the top of the pattern table 62.

For example, the pseudo IO issuing unit 35 checks the history of the usage during the actual operation. If the path p1 was used most recently, the pattern numbers 1 to 5 including the path p1 may be skipped to start the test from the pattern number 6. Thereby, the pseudo IO issuing unit 35 can check the continuity of path that was the most recently accessed lastly.

The pseudo IO issuing unit 35 may also modify the order of the patterns based on the access destinations (RAID) in the actual operation. For example, the access destinations recently used are the RAIDs 521, 522, 523, 524, 525, 511, 512, 513, 514, 515, in this order from the oldest, meaning that RAID 515 was the most recently used.

In such a case, the pseudo IO issuing unit 35 may start a test, starting from the patterns including the RAID 221, and the patterns including the RAID 515 are tested lastly. Thereby, the pseudo IO issuing unit 35 can check the continuity of path that was the most recently accessed, at the end of the test.

The order in the patterns in the pattern table 62 may be modified by the pseudo IO issuing unit 35 every time the IO idle time exceeds the host IO threshold 60. Alternatively, once the order may be changed by the address generator 31 upon a startup of the storage system 1, the order then may be fixed.

The access count of the paths or access destinations may be counted and the pattern order may be sorted in the ascending order of the count. In this case, paths or access destinations that are least frequently used are checked preferentially.

Once the order in the patterns in the pattern table 62 is modified, the modification is notified to the counterpart cluster. Thereby, the modification to the order in the patterns in the pattern table 62 is shared between the clusters.

While issuing the test pseudo IOs in Step S 5, the host IO monitor 33 continues to monitor to determine whether a host IO is detected.

If no host IO is detected (refer to the NO route from Step S 7), the flow proceeds to Step S 11.

If an IO is issued from the host 10 while issuing the test pseudo IOs (refer to the YES route from Step S 7), in Step S 9, the pseudo IO issuing unit 35 suspends the processing of test pseudo IOs and the NAS 3 processes the IO from the host 10. In this step, the pseudo IO issuing unit 35 saves the suspended pattern number. Once the IO idle time from the host 10 exceeds the host IO threshold, the pseudo IO issuing unit 35 resumes the test from that pattern number.

In Step S 7, the pseudo IO issuing unit 35 may also determine whether or not the pseudo IO idle time exceeds a certain threshold, in addition to determining whether the host idle IO time exceeds the host IO threshold 60. In this case, no pseudo IO has been issued for the certain time, the continuity is checked by issuing pseudo IOs. This can prevent the continuity (and hence the redundancy) not being checked for a longer time due to frequent host IOs.

In Step S 11, the pseudo IO decoder 37 determines whether an end of the processing of pseudo IOs in the currently used pattern number is detected (e.g., an IO is deceived from one of the RAIDs 511-515 and 521-525), or whether a timeout occurs.

If an end of the processing of pseudo IOs is not detected and no timeout occurs (refer to the NO route from Step S 11), the pseudo IO decoder 37 continues to process a pseudo IO in Step S 13.

If an end of the processing of pseudo IOs is detected or a timeout occurs in Step S 11 (refer to the YES route from Step S 11), in Step S 15, the pseudo IO decoder 37 determines whether an error or a timeout occurs.

Specifically, in Step S 15, the pseudo IO decoder 37 determines whether a read or write from or to the accessed RAID 511-515 or 521-525 is completed without any timeout. If a timeout occurs, the pseudo IO decoder 37 determines that an error occurs.

Otherwise, if an IO is received from the accessed RAID 511-515 or 521-525 within the timeout duration, the pseudo IO decoder 37 then determines whether an error occurs in the read or write. Specifically, the pseudo IO decoder 37 determines whether an internal error is detected when the read or write is processed based on the IO from the one of the RAID 511-515 and 521-525.

Further, when a read is done after a write, the pseudo IO decoder 37 checks whether the value obtained in the read is the same as the expected value (i.e., the same as the test value written in the write) and determines that an error occurs if the values do not match. In writes, a data is actually written to test regions (not illustrated) in the disks 5.

If an error or a timeout is detected in Step S 15 (refer to the YES route from Step S 15), in Step S 17, the notifier 39 makes an error notification. The notifier 39 makes the error notification by sending an e-mail to a system administrator or a customer engineer, for example. One error report may be made for a single pattern number, or a summary of all errors for the entire pattern numbers may be sent upon the end of the test in Step S 23 (described later).

If no error or timeout is detected in Step S 15 (refer to the NO route from Step S 15), the flow proceeds to Step S 19.

In Step S 19, the pseudo IO issuing unit 35 determines whether there remain untested pattern(s) in the pattern table 62.

If there remain untested pattern(s) in the pattern table 62 (refer to the YES route from Step S 19), in Step S 21, the pseudo IO issuing unit 35 selects the next pattern number and reports that pattern number to the counterpart cluster. The flow then returns to Step S 5 wherein a pseudo IO is issued for the selected pattern.

If there is no untested pattern in the pattern table 62 (refer to the NO route from Step S 19), all patterns in the pattern table 62 have been tested and in Step S 23 the host IO monitor 33 resets the counter for the host IO idle time. When the counter for the pseudo IO idle time is also used, the timer for the pseudo IO idle time is also reset.

Next, processing of a continuity test between the NAS 3-1 (the cluster #1) and the NAS 3-2 (cluster #2) will be described with reference to FIG. 11.

Figure 11:
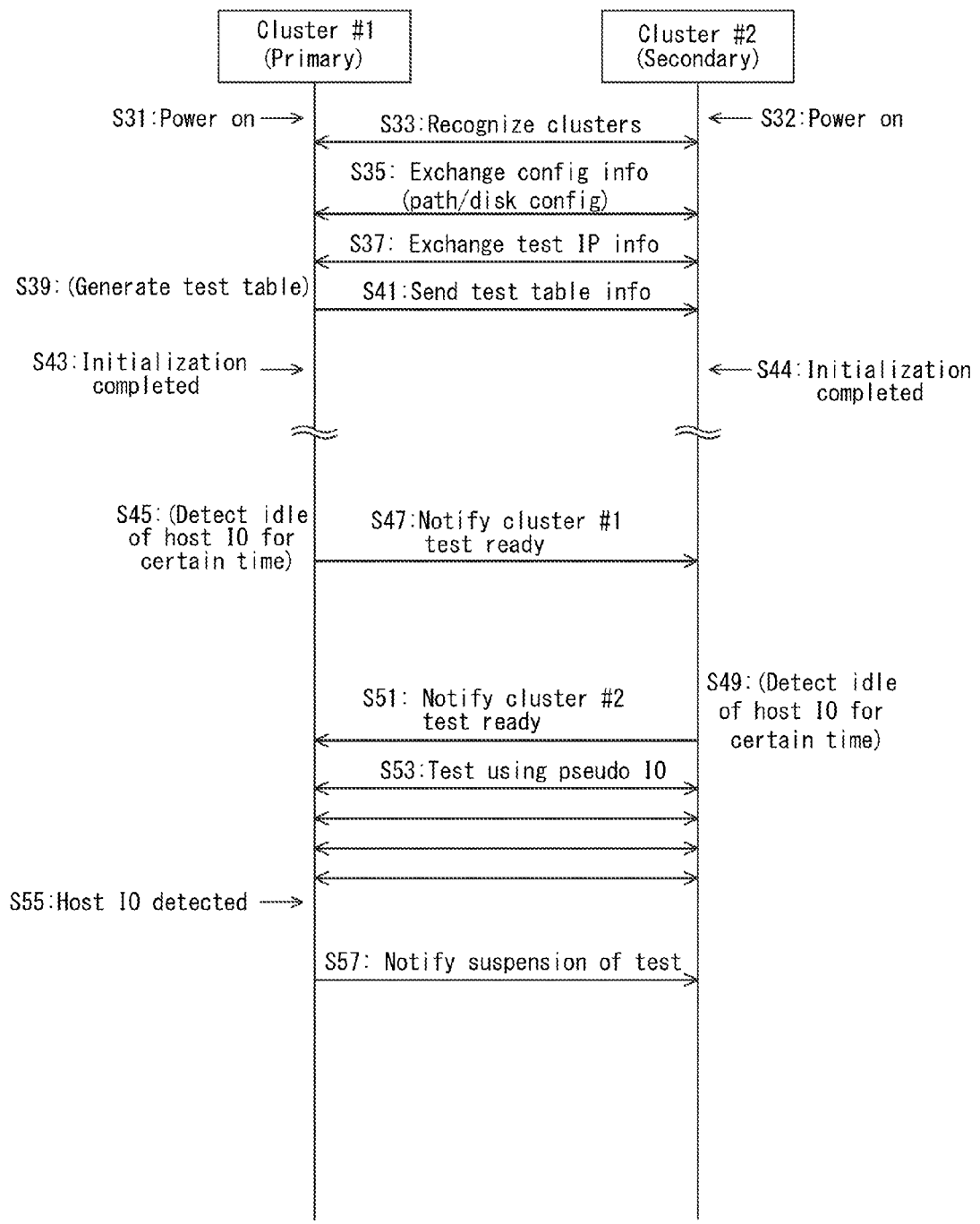
FIG. 11 is a sequence diagram illustrating continuity test processing in accordance with an example of an embodiment.
Figure 14:
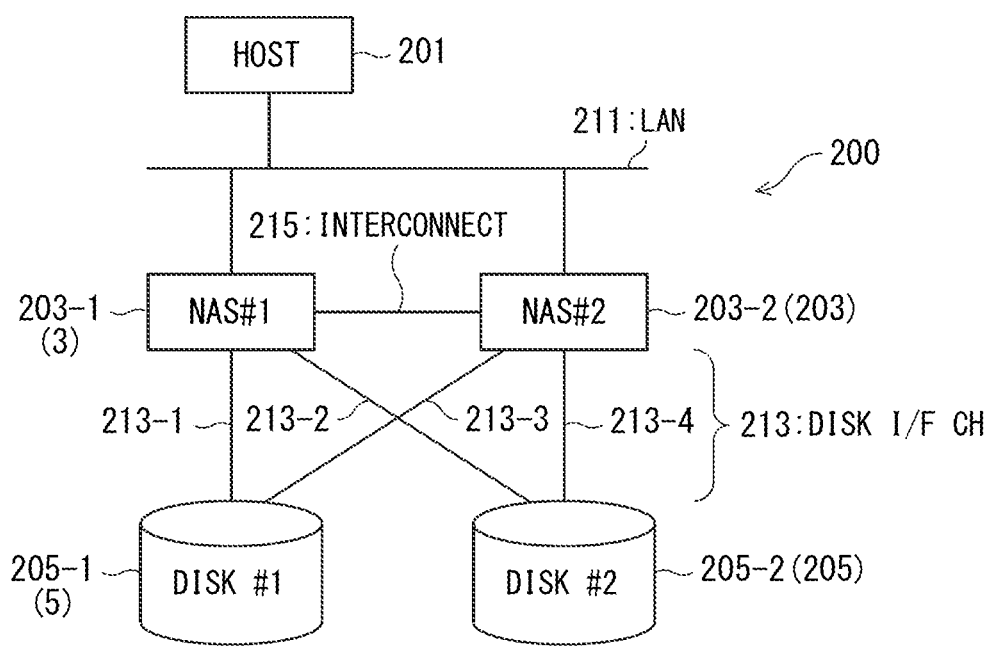
FIG. 14 is a schematic diagram illustrating an example of a storage system.
Figure 15:
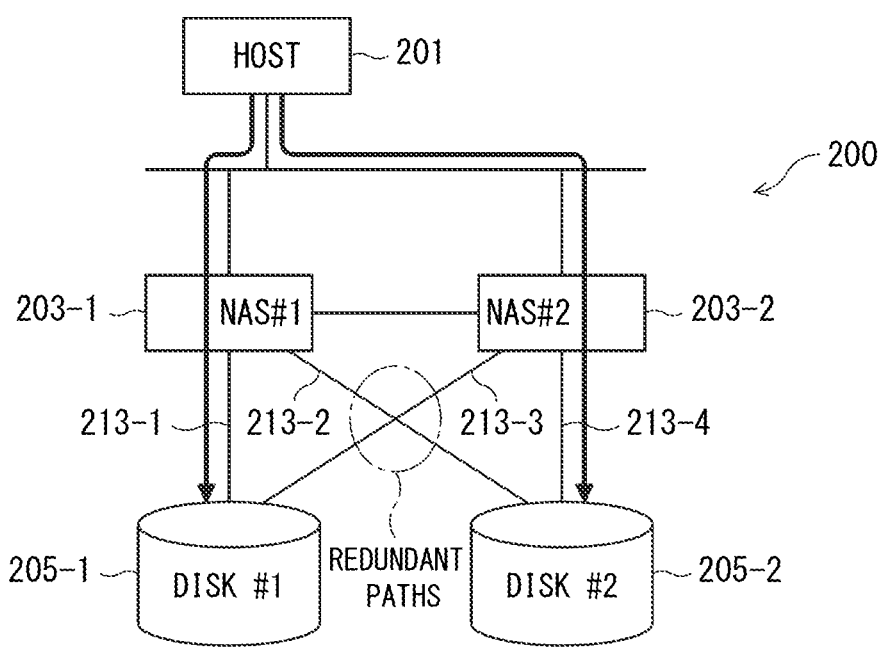
FIG. 15 is a schematic diagram illustrating paths used during normal operations in a NAS in FIG. 14.
Figure 16:
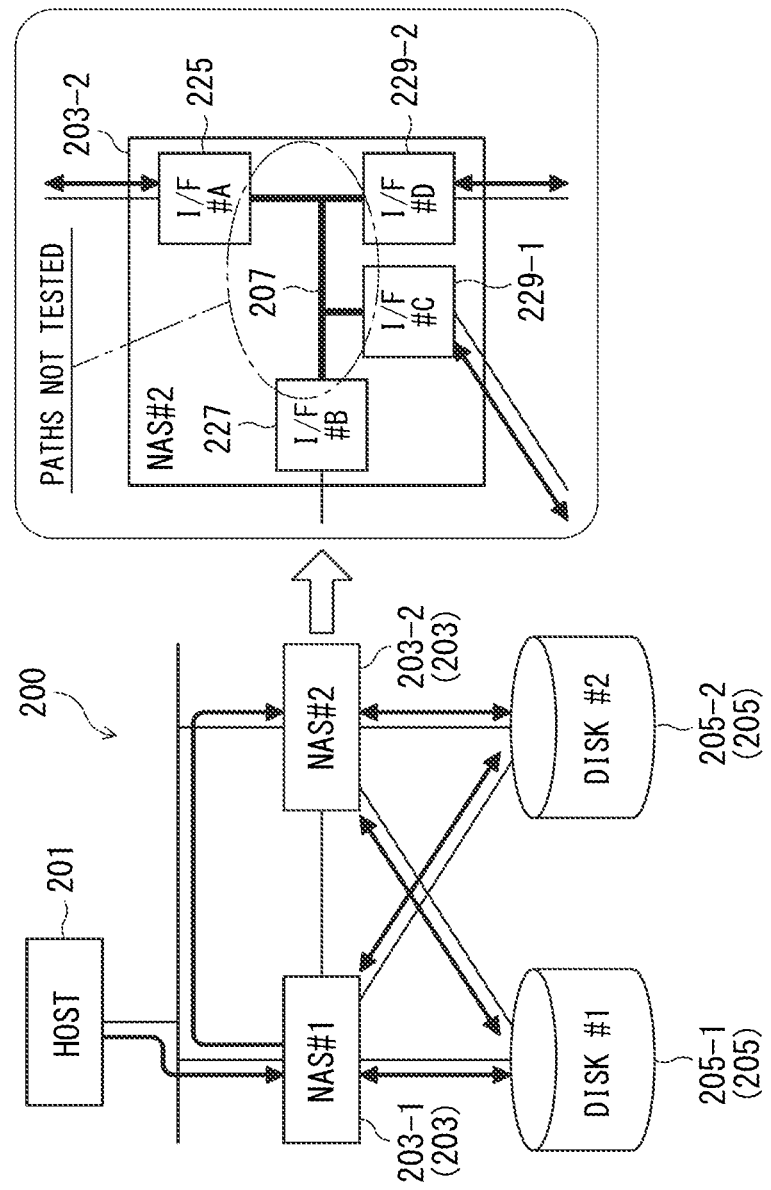
FIG. 16 is a schematic diagram illustrating paths which cannot be tested in the NAS in FIG. 14.

FIG. 11 is a sequence diagram illustrating continuity test processing in accordance with an example of an embodiment.

In Step S 31, the NAS 3-1 is powered on. Next, in Step S 32, the NAS 3-2 is powered on. The NAS 3-1 (the cluster #1) which starts up earlier after being powered on functions as the primary cluster and the NAS 3-2 (cluster #2) which was powered on later functions as the secondary cluster. Note that the NAS 3-1 does not always function as the primary cluster and the NAS 3-2 does not always function as the secondary cluster. A NAS that starts up earlier after being powered on will be the primary cluster, and a NAS that starts up later will be the secondary cluster.

Next, in Step S 33, the clusters recognize their own counterparts via an inter-cluster communication.

Next, in Step S 35, the address generator 31 exchanges configuration information (path and disk configurations) between the cluster #1 and the cluster #2. An example of the format 71 of the information exchanged in Step S 35 is depicted in FIG. 12.

FIG. 12 is a diagram illustrating an example of the data format 71 used for the exchanging configuration information between the clusters in the storage system 1 in accordance with an example of an embodiment.

In the data format depicted in FIG. 12, the fields 72-77 are for the path configuration information, whereas the fields 78-83 are for the disk configuration information.

The path index field 72 includes a value which is a path index number used for identifying and unique to each path.

The path connection target 1 field 73 includes an ID indicating to which the path connects. For example, the values "0x00nn", "0x01nn", and "0x10nn" (nn is any hexadecimal value of between 00 to ff) are set for the host interface 25, the interconnect (FC interface) 27, and the disk interface 29, respectively.

The path connection target 2 fields 74 and 75 each include an ID indicating to which the path connects. For example, the values "0x00nn", "0x01nn", and "0x10nn" (nn is any hexadecimal value of between 00 to ff) are set for the host interface 10, the counter cluster, and the disk interface 5, respectively.

A set of the above fields 72-75 is provided for each path. The value "0xffff" is set to the field 77 for the last path.

The disk index field 78 includes a value which is a RAID disk index number used for identifying each RAID disk and unique to each RAID disk.

The path index field 79 includes the index of the lower path of the disk accessed.

The RAID number field 80 includes the number identifying each RAID disk drive.

The allocation information field 81 includes information indicating whether or not that RAID disk drive is allocated.

A set of the above fields 78-81 is provided for each RAID disk drive. For the last disk, the value "0xffff" is set to the field 82 and the field 83 remains unused.

The above-described data format 71 is used by each NAS 3 to notify the counterpart NAS 3 of information as to the NAS 3 is connected to which host 10/NAS 3/disks 5. Note that paths in the data format 71 are partial paths, unlike the paths in the pattern table 62 (paths from the host 10 to the RAID disks).

Next, in Step S 35, test IP addresses 54 are exchanged between the cluster #1 and the cluster #2.

Next, in Step S 39, the address generator 31 in the primary the cluster #1 generates a test table by combining the test paths, based on the paths obtained in Step S 35. The test table includes the access patterns (test paths) 58 in FIGS. 7 and 8 and the pattern table 62 in FIG. 9.

Next, in Step S 41, the address generator 31 in the primary the cluster #1 sends the pattern table 62 generated in Step S 39 to the secondary cluster #2. An example of the format 91 of the information exchanged in Step S 41 is depicted in FIG. 13.

FIG. 13 is a diagram illustrating an example of the data format used for transmitting the test table information in the storage system 1 in accordance with an example of an embodiment.

In FIG. 13, the fields 92-95 represent the access patterns (test paths) 58.

The pattern index field 92 identifies the paths p1-p8 used in the pattern table 63.

The configuration path 1 index field 93 identifies the upper path (host path). The configuration path 2 index field 94 identifies the interconnect path, and may be unused.

The configuration path 3 index field 95 identifies the disk interface path.

A set of the above fields 92-95 is provided for each access pattern.

The fields 98-105 represent the pattern table 62.

The pattern index field 98 identifies the pattern number in the pattern table 62.

The test IO originator field 99 identifies the NAS 3-1 or the NAS 3-2.

The access path index 100 identifies the access pattern used. This field contains the value of the pattern index field 92 for the access pattern stored in the fields 92-95.

The access destination field 101 identifies the RAID number to be accessed.

The test content fields 102-105 indicate the details of the test. These fields contain a read (Rd) or write (Wt) or verify, a data length, a data pattern, an expected value, for example.

A set of the above fields 98-95 is provided for each test pattern.

In Step S 43, the address generator 31 in the cluster #1 completes the initialization.

In Step S 44, the address generator 31 in the cluster #2 completes the initialization. Note that either of Steps S 43 and S 44 may be executed first.

In Step S 45, the host IO monitor 33 in the cluster #1 detects that the time duration set in the host IO threshold 60 elapses after the last host IO was detected.

In response to the elapse of the host IO idle time being detected in Step S 45, in Step S 47, the notifier 39 in the cluster #1 notifies the cluster #2 that the cluster #1 is ready for a test.

In Step S 49, the host IO monitor 33 in the cluster #2 detects that the time duration set in the host IO threshold 60 elapses after the last host IO was detected.

In response to the elapse of the host IO idle time being detected in Step S 51, in Step S 51, the notifier 39 in the cluster #2 notifies the cluster #1 that the cluster #2 is ready for a test.

In Step S 53, the pseudo IO issuing unit 35 in the cluster #1 and the pseudo IO issuing unit 35 in the cluster #2 issue pseudo IOs to execute the test patterns in the pattern table 62.

In Step S 55, the host IO monitor 33 in the cluster #1 detects a host IO.

In response to detecting the host IO, in Step S 57, the notifier 39 in the cluster #1 notifies of suspension of the test.

Note that the cluster recognition in Step S 33, the exchange of the test IP addresses in Step S 37, the test ready notifications in Steps S 47 and S 51, and the suspension of the test in Step S 57 are made using short message formats typically use among clusters, for example. In the test using pseudo IOs in Step S 53, message formats used for typical accesses (IOs) via the host interface 25 is used, for example.

(C) Advantageous Effects

An embodiment of the present embodiment is advantageous in the following points.

Continuity tests that cannot be done with internal transfer tests can be made, and redundant paths that cannot be checked in normal operations from the host IO or patrols can be checked. Hence, the redundancy can be maintained, which improves the reliability of the storage system 1.

Further, tests can be executed when the storage system 1 is not busy, without using the resources of the host 10, which can prevents the performance of the host 10 from deteriorating for maintenance tasks.

Further, tests optimal to the system configuration can be made and selected by means of inter-cluster communications, without requiring any interventions by the system administrator, and thus man-hours for maintenance tasks can be reduced.

Additionally, the timing for continuity check, access patterns to be used (drives to be accessed) can be flexibly set. For example, recently-accessed disks or access patterns are preferentially checked, or least-recently-accessed disks or access patterns are preferentially checked. Further, since the licenses in the clusters are recognized from each other, any file access protocols can be used, such as the Common Internet File System (CIFS) and the Network File System (NFS).

(D) Miscellaneous

Note that the present disclosure is not limited to the configuration of the embodiments and their modifications set forth above, and may be modified in various manners without departing from the sprit of the present disclosure.

For example, the storage system 1 includes the two NASs 3 and two disks 5 in the example of the embodiment described above, three or more NASs 3 and/or disks 5 may be provided. Multiple NASs 3 and/or disks 5 may also be provided in each cluster.

The functions and configurations in the functional blocks depicted in FIG. 3 are merely exemplary, and the functions and configurations may be combined.

The pattern table 62 in FIG. 9 is merely exemplary, and the frequency of the test may be modified depending on the operation conditions, application, and the like, of the system.

For example, if the disk 5-1 stores important data, the pattern table 62 may have more patterns to access the RAIDs 511-515.

The disk access paths may also be modified based on the criticality of the paths.

The steps in the flowchart in FIG. 10 may be executed in different orders.

Further, the data formats depicted in FIGS. 12 and 13 are merely exemplary, and the data formats may be modified depending on the operation. For example, the data format in FIG. 12 may be divided into two message, each for the path configuration and the disk configuration. The data format in FIG. 13 may be divided into two message, each for the access patterns and the test patterns.

In the above embodiment, the CPU 21 in the NAS 3 functions as the test unit 30, the address generator 31, the host IO monitor 33, the pseudo IO issuing unit 35, the pseudo IO decoder 37, and the notifier 39 in FIG. 3, by executing a test program.

The memory 3 in the NAS 3 functions as the host IP address storage 51, the test IP address storage 53, the disk configuration information storage 55, the disk access path information storage 57, the host IO threshold storage 59, and the test pattern storage 61.

Note that the test program for implementing the functions as the test unit 30, the address generator 31, the host IO monitor 33, the pseudo IO issuing unit 35, the pseudo IO decoder 37, and the notifier 39 are provided in the form of programs recorded on a tangible computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon embodying the functions as the test unit 30, the address generator 31, the host IO monitor 33, the pseudo IO issuing unit 35, the pseudo IO decoder 37, and the notifier 39, the program stored in an internal storage device (the memory 23 in the NAS 3 in this embodiment) is executed by a microprocessor of the computer (the CPU 21 in the NAS 3 in this embodiment). In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the NAS 3 includes a function as a computer.

In accordance with the controller, the storage apparatus, the method for testing a storage apparatus, and a tangible computer-readable storage medium, the reliability of the storage apparatus is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A controller comprising:
an address generator that sets a plurality of different paths, each connecting an information processing apparatus connected to a storage apparatus via a network, first and second storage mediums, and the controller, and generates a second address that is different from a first address used for a communication with the information processing apparatus via the network;
an access monitor that determines that no access has been issued for a certain time duration from the information processing apparatus to the first or second storage medium;
an access issuing unit that issues, in response to the access monitor determining that no access has been issued for the certain time duration from the information processing apparatus, a test access to the first and second storage mediums on one of the plurality of paths, using the second address; and
an access decoder that converts the test access to an access including the first address, receives a result of the access including the first address from the one of the first and second storage mediums, and checks for an error,
wherein the access issuing unit issues the test access preferentially on one of the plurality of different paths, based on a history of usage of the storage apparatus.

2. The controller according to claim 1, wherein the address generator notifies a second controller of the generated plurality of different paths and the second address.

3. The controller according to claim 1, wherein the first and second storage mediums each comprise a plurality of drives, and the address generator sets the plurality of different paths to the plurality of drives of the first and second storage mediums.

4. The controller according to claim 1, wherein the plurality of different paths comprise a normal path and a redundant path.

5. The controller according to claim 1, wherein the first and second addresses are Internet Protocol (IP) addresses.

6. A storage apparatus, comprises:
a first storage medium;
a second storage medium; and
a controller comprising:
an address generator that sets a plurality of different paths, each connecting an information processing apparatus connected to a storage apparatus via a network, the first and second storage mediums, and the controller, and generates a second address that is different from a first address used for a communication with the information processing apparatus via the network;
an access monitor that determines that no access has been issued for a certain time duration from the information processing apparatus to the first or second storage medium;
an access issuing unit that issues, in response to the access monitor determining that no access has been issued for the certain time duration from the information processing apparatus, a test access to the first and second storage mediums on one of the plurality of paths, using the second address; and
an access decoder that converts the test access to an access including the first address, receives a result of the access including the first address from the one of the first and second storage mediums, and checks for an error,
wherein the first controller controls the first storage medium, and controls the second controller upon a failure of the second controller,
the second controller controls the second storage medium, and controls the first controller upon a failure of the first controller,
wherein the access issuing unit issues the test access preferentially on one of the plurality of different paths, based on a history of usage of the storage apparatus.

7. The storage apparatus according to claim 6, wherein the first and second addresses are Internet Protocol (IP) addresses.

8. A method of testing a storage apparatus, comprising:
setting a plurality of different paths, each connecting an information processing apparatus connected to a storage apparatus via a network, first and second storage mediums, and a controller, and generating a second address that is different from a first address used for a communication with the information processing apparatus via the network;
determining that no access has been issued for a certain time duration from the information processing apparatus to the first or second storage medium;
issuing, in response to determining that no access has been issued for the certain time duration from the information processing apparatus, a test access to the first and second storage mediums on one of the plurality of paths, using the second address; and
converting the test access to an access including the first address, receiving a result of the access including the first address from the one of the first and second storage mediums, and checking for an error,
wherein the issuing comprises issuing the test access preferentially on one of the plurality of different paths, based on a history of usage of the storage apparatus.

9. The method according to claim 8, further comprising notifying a second controller of the plurality of different paths and the second address.

10. The method according to claim 8, wherein the first and second storage mediums each comprise a plurality of drives, and the setting comprising setting the plurality of different paths to the plurality of drives of the first and second storage mediums.

11. The method according to claim 8, wherein the plurality of different paths comprise a normal path and a redundant path.

12. The method according to claim 8, wherein the first and second addresses are Internet Protocol (IP) addresses.

13. A non-transitory tangible computer-readable storage medium, storing a test program for a storage apparatus, when executed by the computer, the test program making the computer:
set a plurality of different paths, each connecting an information processing apparatus connected to a storage apparatus via a network, first and second storage mediums, and a controller, and generate a second address that is different from a first address used for a communication with the information processing apparatus via the network;
determine that no access has been issued for a certain time duration from the information processing apparatus to the first or second storage medium;
issue, in response to determining that no access has been issued for the certain time duration from the information processing apparatus, a test access to the first and second storage mediums on one of the plurality of paths, using the second address; and convert the test access to an access including the first address, receive a result of the access including the first address from the one of the first and second storage mediums, and check for an error, wherein the test program makes the computer issue the test access preferentially on one of the plurality of different paths, based on a history of usage of the storage apparatus.

14. The non-transitory tangible computer-readable storage medium according to claim 13, wherein the test program further makes the computer notify a second controller of the plurality of different paths and the second address.

15. The non-transitory tangible computer-readable storage medium according to claim 12, wherein the first and second storage mediums each comprise a plurality of drives, and the test program makes the computer set the plurality of different paths to the plurality of drives of the first and second storage mediums.

16. The non-transitory tangible computer-readable storage medium according to claim 13, wherein the plurality of different paths comprise a normal path and a redundant path.

17. The non-transitory tangible computer-readable storage medium according to claim 13, wherein the first and second addresses are Internet Protocol (IP) addresses.

* * * * *